United States Patent
Dittly

(10) Patent No.: US 8,668,558 B2
(45) Date of Patent: Mar. 11, 2014

(54) BIG GAME FIELD DRESSING TOOL

(75) Inventor: Bruce W Dittly, North Tonawanda, NY (US)

(73) Assignee: Bruce W. Dittly, North Tonawanda, NY (US)

(*) Notice: Subject to any disclaimer, the term of this patent is extended or adjusted under 35 U.S.C. 154(b) by 113 days.

(21) Appl. No.: 13/374,319

(22) Filed: Dec. 21, 2011

(65) Prior Publication Data

US 2012/0231718 A1 Sep. 13, 2012

Related U.S. Application Data

(60) Provisional application No. 61/464,713, filed on Mar. 9, 2011.

(51) Int. Cl.
*A22C 18/00* (2006.01)

(52) U.S. Cl.
USPC .......................................................... 452/149

(58) Field of Classification Search
USPC ......... 452/102–105, 120, 125, 128, 132, 149, 452/185, 194, 197; 81/20, 24–26; 294/81.1, 294/81.2, 81.54, 81.21, 81.3, 67.4, 74, 294/81.56, 82.1
See application file for complete search history.

(56) References Cited

U.S. PATENT DOCUMENTS

| | | | | | |
|---|---|---|---|---|---|
| 1,744,909 | A | * | 1/1930 | Magnusson | 30/121 |
| 2,022,954 | A | * | 12/1935 | Cook | 30/123.5 |
| 4,283,854 | A | | 8/1981 | Austin | |
| 4,672,745 | A | | 6/1987 | Wilkins | |
| 5,581,895 | A | | 12/1996 | Jeffcoat | |
| 6,955,228 | B2 | * | 10/2005 | Hixon | 172/378 |
| 7,455,521 | B2 | * | 11/2008 | Fishburne, Jr. | 433/142 |
| 7,487,565 | B1 | | 2/2009 | Sundling | |
| 2005/0278957 | A1 | * | 12/2005 | McCullough | 30/279.6 |
| 2010/0018063 | A1 | | 1/2010 | Dittly | |

* cited by examiner

*Primary Examiner* — Richard Price, Jr.

(57) ABSTRACT

A cutting tool is provided for safely dressing a game animal having a handle and a fork section including first and second elongated shielding members shielding the hunter's hands and a cutting blade positioned between the first and second elongated shielding members and perpendicular relative to a longitudinal axis extending along the length of the cutting tool and wherein the handle is configured in a T-shaped manner for providing a good grip and wherein the cutting blade is positioned under outer surfaces of the first and second elongated shielding members to further shield the hunter's hands. The cutting tool is pushed against various membranes and the trachea to safely cut it for the removal of the heart and lungs of the game animal.

16 Claims, 1 Drawing Sheet

BIG GAME FIELD DRESSING TOOL

RELATED APPLICATIONS

This application claims the benefit of provisional application 61/464,713 filed Mar. 9, 2011.

BACKGROUND OF THE INVENTION

There are various problems associated with field dressing big game animals:
A. Opening the animal without exposing a sharp knife to the hunter's hands and/or fingers, thus causing accidental injury.
B. Opening the animal and/or cutting membranes that fasten the viscera within the animals abdominal cavity without rupturing the internal organs which can spoil or taint the animal's meat to be eaten.
C. Reaching up into the chest cavity to cut the trachea for the removal of the heart and lungs.
D. A problem exists for those hunters choosing to use plastic field dressing gloves and keeping the gloves from being cut, which can expose the hunter to the animal's bodily fluids throughout the rest of the process. The present invention addresses a desired procedure for removing the heart and lungs from a big game animals chest cavity.

It is also desirable to provide a better means of cutting other membranes for removing the viscera and and it is also desirable to provide a safer means of severing the trachea for removing the heart and lungs. The current practice involves having the hunter reach up into the chest cavity with both hands and arms. For a right handed hunter, the hunter would reach up with his/her left hand and find the trachea above the heart and lungs. Then, with a sharp knife in the right hand, move the knife in and up past the left hand to a point higher yet than the left hand.

The hunter then manipulates and turns the knife approximately 90 degrees, and cut thru the trachea. Shortcomings of such prior art approaches are as follows. The hunter must blindly push a sharp knife past his or her hand and turn the knife 90 degrees, exposing the hunter to accidental cutting. This blind manipulation of the knife for cutting, further exposes the hunter's hands/fingers to danger.

Also the hunter's field dressing gloves can be easily cut, exposing the hunter's skin and clothing to the animal's blood. Additionally, using a sharp knife to cut through the sternum dulls the blade edge, rendering the knife less useful for the remaining field dressing procedure.

However, hunters that wish to mount their big game will not cut through the sternum as it ruins the cape.

SUMMARY OF A PREFERRED EMBODIMENT OF THE INVENTION

The method of the invention is directed to aiding dressing of a game animal comprises providing a cutting tool having a T-shaped handle for providing a firm grip, and a fork section including first and second elongated shielding members, along with a cutting blade positioned between the first and second elongated shielding members and perpendicular to a longitudinal axis extending along the length of the cutting tool, and pushing the cutting tool against the trachea to cut the trachea for enabling removal of the game animal's heart and lungs.

DETAILED DESCRIPTION OF PREFERRED EMBODIMENTS OF THE INVENTION

Figure 1:
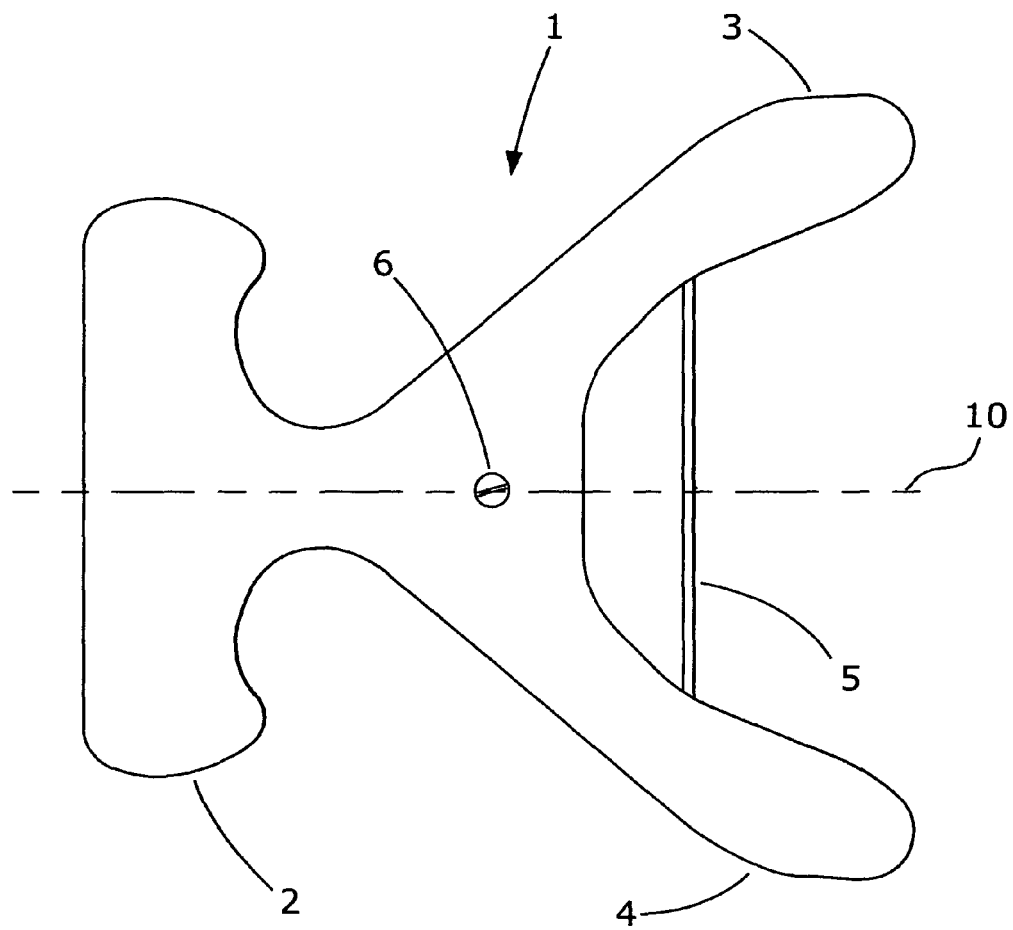
FIG. 1 shows a top view of the cutting tool and FIG. 2 shows a front view of the cutting tool used to carry out the method of the invention.
Figure 2:
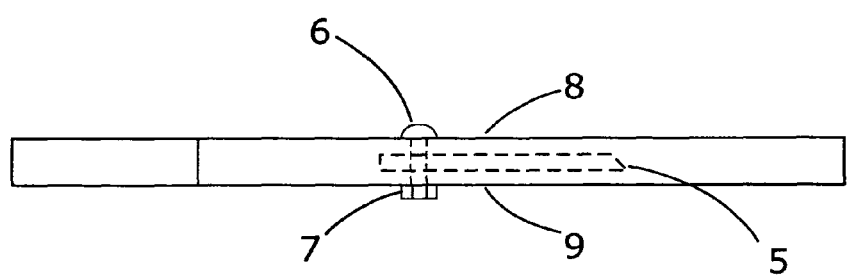

The invention involves use of a cutting tool that takes the place of the aforesaid hunter's knife, for the purpose of severing the trachea for removing the heart and lungs. The tool is also used for cutting the heavy membrane known as the diaphragm away from the chest wall, and for cutting other veins and membranes that attach the viscera to the abdominal cavity. The cutting tool 1 has a "T" shaped handle 2 enabling a firm manual grip as shown in FIG. 1. The handle fits in the palm of the hunter's hand, allowing the greatest freedom of movement. A fork section is formed adjacent to the handle. Within the fork, and perpendicular to a handle axis 10, a standard utility blade 5 is mounted by a rivet or a threaded bolt 6 with its associated nut 7 as shown in FIG. 2.

The hunter first reaches up with the non-tool hand past the heart/lungs to locate the trachea. The trachea is held between a finger and thumb for support while cutting.

The hunter then pushes the field dressing tool past his/her hand, locating the trachea.

Once found, a straight push drives the blade through the trachea, cutting it to free the heart and lungs.

Advantages of this invention over prior art/apparatus are as follows.

The tool keeps the hunters hand/fingers further away and shielded from the blade while positioning the tool for the cut as the blade is mounted between the fork shielding portions 3 and 4 and centered within the structure. The hunter does not have to turn and manipulate the cutting blade as mentioned above to cut the trachea as the blade is already positioned perpendicular to the trachea.

The blade 5 is positioned internally within the fork section, thus shielding the left hand of a right handed hunter's hand from being cut and further shields the hunter's hand since the cutting blade is positioned below outer surfaces 8 and 9 of both elongated shielding members 3 and 4 as shown in FIG. 2. Also, because the blade is centered within the fork structure, there is less chance of cutting into other areas of the viscera while continuing the cuts to the diaphragm and other membranes while loosening the viscera for removal.

Accordingly, the present invention is directed to a method of aiding safe dressing of a game animal including
(a) providing a cutting tool 1 having a handle 2 and a fork section including first and second elongated shielding members 3 and 4; and wherein
(a-1) a cutting blade 5 is positioned between the first and second elongated shielding members and transverse relative to a longitudinal axis 10 extending along the length of the cutting tool; and
(b) using the cutting tool to cut various internal portions of said game animal in a safe manner.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the appended claims.

I claim:

1. A method of safely aiding dressing of a game animal comprising:
   (a) providing a cutting tool having a handle and a fork section including first and second elongated shielding members;
   (a-1) a cutting blade positioned between the first and second elongated shielding members and transverse relative to a longitudinal axis extending along the length of the cutting tool;
   (b) and using the cutting tool to cut various internal portions of said game animal in a safe manner.

2. The method of claim 1 wherein said cutting blade is perpendicular with respect to the longitudinal axis.

3. The method of claim 2 wherein said handle is configured in a T shaped manner.

4. The method of claim 3 wherein the cutting blade is positioned under outer surfaces of the first and second elongated shielding members.

5. The method of claim 2 wherein the cutting blade is positioned under outer surfaces of the first and second elongated shielding members.

6. The method of claim 1 wherein said handle is configured in a T shaped mariner.

7. The method of claim 6 wherein the cutting blade is positioned under outer surfaces of the first and second elongated shielding members.

8. The method of claim 1 wherein the cutting blade is positioned under outer surfaces of the first and second elongated shielding members.

9. A method of safely aiding dressing of a game animal comprising:
   (a) providing a culling tool having a handle and a fork section including first and second elongated shielding members;
   (a-1) a cutting blade positioned between the first and second elongated shielding members and transverse relative to a longitudinal axis extending along the length of the cutting tool;
   (b) and pushing the cutting tool against the trachea for enabling removal of the game animal's heart and lungs.

10. The method of claim 9 wherein said cutting blade is perpendicular with respect to the longitudinal axis.

11. The method of claim 10 wherein said handle is configured in a T shaped manner.

12. The method of claim 11 wherein the cutting blade is positioned under outer surfaces of the first and second elongated shielding members.

13. The method of claim 10 wherein the cutting blade is positioned under outer surfaces of the first and second elongated shielding members.

14. The method of claim 9 wherein said handle is configured in a T shaped manner.

15. The method of claim 14 wherein the cutting blade is positioned under outer surfaces of the first and second elongated shielding members.

16. The method of claim 9 wherein the cutting blade is positioned under outer surfaces of the first and second elongated shielding members.

* * * * *